United States Patent [19]
Ikeda

[11] Patent Number: 5,938,727
[45] Date of Patent: Aug. 17, 1999

[54] COMMUNICATION SYSTEM AND METHOD VIA DIGITAL CODES

[76] Inventor: Takashi Ikeda, 2-1639-1-607, Nisshin-cho, Omiya, Saitama-ken, Japan

[21] Appl. No.: 08/791,982

[22] Filed: Jan. 31, 1997

[30] Foreign Application Priority Data

Feb. 1, 1996 [JP] Japan ..................................... 8-037052
Jan. 10, 1997 [JP] Japan ..................................... 9-002965

[51] Int. Cl.[6] ........................... G06F 13/38; G06F 15/17; H04L 29/00
[52] U.S. Cl. ............................. 709/218; 709/245; 705/26
[58] Field of Search ........................ 395/200.33, 200.36, 395/200.47, 200.48, 200.49, 200.57, 200.75; 705/26, 27; 364/237.35; 463/36; 709/203, 206, 217, 218, 219, 227, 245

[56] References Cited

U.S. PATENT DOCUMENTS

| | | |
|---|---|---|
| 5,047,614 | 9/1991 | Bianco . |
| 5,239,487 | 8/1993 | Horejsi et al. . |
| 5,383,029 | 1/1995 | Kojima . |
| 5,491,820 | 2/1996 | Belove et al. . |
| 5,572,643 | 11/1996 | Judson ............................. 395/200.48 |
| 5,640,193 | 6/1997 | Wellner ............................ 395/200.48 |
| 5,804,803 | 9/1998 | Cragun et al. ..................... 395/200.48 |

OTHER PUBLICATIONS

Heylighen, F.; "World–Wide Web: a distributed paradigm for global networking"; Proceeding SHARE Europe Spring Conference; pp. 355–368, Apr. 18, 1994.

*Primary Examiner*—Mark H. Rinehart
*Attorney, Agent, or Firm*—Wenderoth, Lind & Ponack, L.L.P.

[57] ABSTRACT

The present invention provides a communication system for identifying the desired destination, comprising: a destination specifying tag with a digital code corresponding to each of the destinations, means for selecting a kind of communication, means for reading out the digital code printed on the tag, means responsive of the reading out of the digital code for converting the digital information included in the digital code to the identification code of the desired destination, apparatus means for communicating to the destination specified by the identification code. In particular, in a preferred embodiment of the present invention, the digital code is a two-dimensional barcode and the means for reading the digital code is a two-dimensional barcode reader. The communication to be performed includes telephone, facsimile transmission, access to a WWW homepage on the Internet, and E-mail transmission over the Internet.

8 Claims, 10 Drawing Sheets

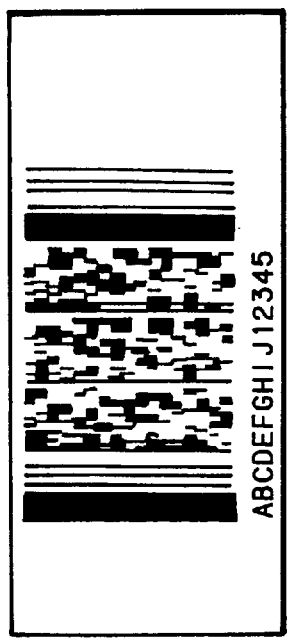
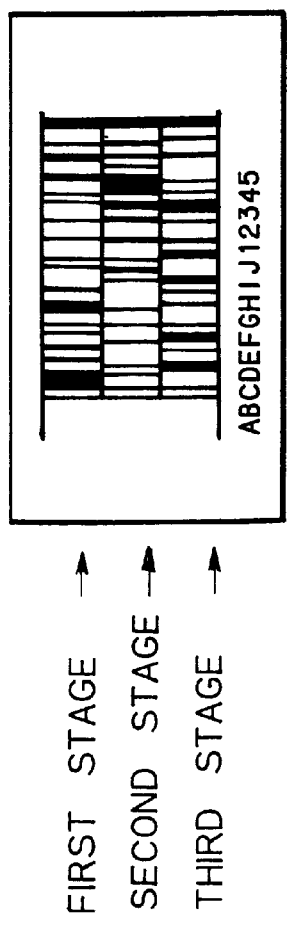
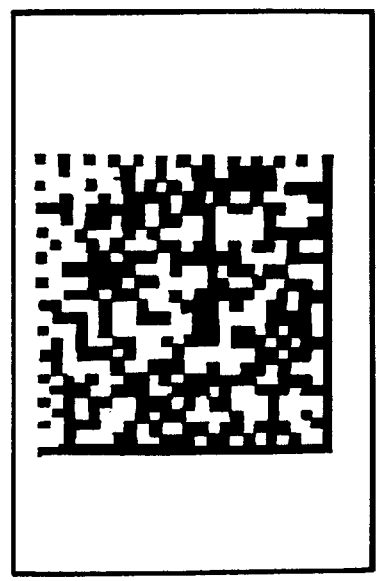
Fig. 6
FIRST STAGE →
SECOND STAGE →
THIRD STAGE →
Fig. 7

ABC REAL ESTATE

OMIYA BRANCH

SATOSHI TOBE

〒344 1-8-13 CENTRAL ST,OMIYA
T E L (04X) 76X-25X6 FAX(048)76X-2X6X

COMMUNICATION SYSTEM AND METHOD VIA DIGITAL CODES

BACKGROUND OF THE INVENTION

The present invention pertains to an apparatus and method for accessing a World Wide Web (WWW) homepage by employing a barcode and a scanner.

Further, the present invention more generally relates to a communication system and method. More particularly, the present invention relates to a communication system and method wherein it will be much easier for users to employ a plurality of communication means such as the Internet or ordinary telephone via a single user interface by uniquely designating a digital code, such as a two-dimensional barcode, to the identification information of an individual.

In connecting to a homepage on the Internet via a personal computer by using, for example, Netscape Navigator, according to a conventional manner, a cursor is positioned on the window designed for netsites and an optional URL (Uniform Resources Locators) is inputted through a keyboard.

However, a URL consisting of a combination of letters and symbols contains a large number of characters. Therefore, those who are not accustomed to a keyboard operation or the Roman alphabet often find it laborious to input a URL through a keyboard, and thus they even fail to access a desired homepage because of an input mistake.

Given the aforementioned background, the inventor of the present invention took advantage of a barcode widely used in the distribution industry for the purpose of merchandise testing, inventory management, and sales management, etc. to provide an apparatus and method for accessing a WWW homepage, by which a targeted homepage can be instantaneously accessed without involving a keyboard operation, wherein a barcode representing an address such as a URL is affixed on a medium such as a magazine advertisement or a newspaper insert and the barcode read by a scanner is converted to a URL so as to have browser software, such as Mosaic or Netscape Navigator, access the desired homepage.

There are a plurality of means to electronically communicate with a specific person. The telephone is the most frequently used means, followed by the vastly used facsimile. More recently, on-line communication using a personal computer is also used by many people. In order to communicate via these various tools, more than one identification code must be designated to a person, namely a telephone number, a facsimile number, a URL of a homepage on the World Wide Web (WWW), or an E-mail address. Each of these identification codes has a different user interface, depending upon the technical characteristics, and thus cannot be handled in a uniform manner.

The following description will first focus on communications on the Internet through which we can browse around homepages provided on the WWW and also send an E-mail to a specific individual. In these cases, the code used to identify the other party of the communication includes a URL and an E-mail address which must be specified on the displayed screen of a mailer or browser for initiating the communication. In cases other than these two, an address corresponding to the destination of the communication has to be specified when one wishes to use a function or facility available on the Internet.

There are other methods for connecting to a specific homepage on the WWW. For example, from a homepage that one is currently visiting or from a page showing a search result of a search engine, one can move to another homepage hyper-linked via a protocol called HTTP by clicking a portion where an HTML anchor tag is embedded with a pointing device such as a mouse. Typically, one can also move to a specific page on the WWW by clicking the page included in the bookmark list of the browser.

In the course of continuously moving about a plurality of homepages or "net-surfing" on the WWW with the above method, the user or the net-surfer does not have to know the actual URL's that are attached to the pages being visited by the person. This is because the browser automatically recognizes the embedded URL of each of the destination sites on the currently visited page and moves to the thus specified page by clicking a specific anchor tag.

When one sends an E-mail over the Internet, he/she has to specify the E-mail address of the receiving party. In many cases, however, the sender of an E-mail uses the list of the frequent addressed destinations and specifies one of them. To do so, when the E-mail has been written and is ready to be sent, the sending party opens a window of the address book page of the associated software and selects the desired destination by clicking it with a mouse. Thus the sending party does not have to remember or be conscious of the actual address of the desired destination once he/she has added the address into the address book.

Next, the description will focus on how telephone calls are made or how facsimiles are transmitted. In such cases, the sending party has to specify the telephone or facsimile number of the desired destination. And yet, in order to communicate with one of the frequently addressed destinations, such a number can be stored in the memory of the telephone or facsimile machine and one has only to specify the stored number by using appropriate means without being conscious of the actual number.

As described above, a plurality of methods of specifying a desired destination address coexist depending upon what kind of communication is to be selected. However, such a coexistence, as a result, makes it inconvenient to handle a number of different kinds of frequent transmissions because the user interface is different and thus cannot be processed in a uniform manner. Also, in terms of the management of a large database of information on a number of individuals which is used in such an industry that gathers and maintains lists of a large number of clients, a unified and simplified method is, if any, preferred. This desired method is preferably employed without actually knowing the address of the destination just as was the case in making a telephone call or transmitting a facsimile using a stored address in the memory.

Further, when an individual or corporate entity wishes to be accessed by a large number of unspecified clients, it is convenient for the code which represents their identification information to be unified and provided in a single medium such as a telephone, facsimile, or a WWW homepage without being specific. It is more preferable for such a code to be a printed apparatus provided on a medium such as a paper in a scannable manner.

SUMMARY OF THE INVENTION

Accordingly, a purpose of the present invention is to provide a system or method which makes it possible to easily access a WWW homepage. Further, another purpose of the present invention is to provide a system and method which makes it possible for more than one kind of communication to be performed in a unified manner by selecting the desired kind of communication displayed on a computer screen or on a portable information device.

With a view towards providing the above-described system and method, a system for accessing a WWW homepage according to the present invention comprises: a medium on which a barcode representing an address such as a URL is affixed, a scanner for reading the barcode, the scanner being connected to an apparatus such as a personal computer to be connected to the Internet; and software containing a procedure for converting a barcode read by the scanner to a URL and having a WWW client software connect a homepage on the screen.

Furthermore, a method for accessing a WWW homepage according to the present invention includes a procedure for reading a barcode representing an address, such as a URL, by a scanner apparatus converting the thus read code to a URL; and a procedure for having WWW client software, such as Mosaic and Netscape Navigator, access a desired homepage by the thus read URL.

Still further, a medium concerning the present invention carries a barcode representing an address such as a URL. A specific example of such a medium may be a magazine advertisement or a newspaper insert.

In accordance with one embodiment of the invention, a communication system for identifying the desired destination is provided, comprising: a destination specifying tag with a digital code corresponding to each of the destinations, means for selecting a kind of communication, means for reading out the digital code printed on the tag, means responsive of the reading out of the digital code for converting the digital information included in the digital code to the identification code of the desired destination, apparatus means for communicating to the destination specified by the identification code.

In particular, in a preferred embodiment of the present invention, the digital code is a two-dimensional barcode and the means for reading the digital code is a two-dimensional barcode reader. The communication to be performed includes telephone, facsimile transmission, access to a WWW homepage on the Internet, and E-mail transmission over the Internet.

In accordance with another embodiment of the invention, a communication method for identifying the desired destination is provided, comprising the steps of: providing a destination specifying tag with a digital code corresponding to each of the destinations, selecting a kind of communication, reading out the digital code printed on the tag, converting, in response to the reading out of the digital code, the digital information included in the digital code to the identification code of the desired destination, and communicating to the destination specified by the identification code.

BRIEF DESCRIPTION OF THE DRAWINGS

For a more complete understanding of the present invention and the advantages thereof, reference should be made to the following Detailed Description taken in connection the accompanying drawings in which:

FIG. 6 shows examples of stack-type two-dimensional barcodes;

FIG. 7 shows examples of matrix-type two-dimensional codes;

DETAILED DESCRIPTION

According to an apparatus for accessing a WWW homepage of the present invention, first, a barcode representing a URL as well as the URL itself are printed side by side on a printed medium such as a magazine advertisement or newspaper insert. When a user who has found an interesting object in the printed medium has the affixed barcode scanned by a scanner, software incorporated into the user's personal computer operates to convert the barcode to a URL so as to have a WWW client software, such as Mosaic and Netscape Navigator, recognize it, whereby a specified homepage is instantaneously accessed and displayed on the screen and the desired information is obtained.

Furthermore, according to a method for accessing WWW homepage of the present invention, a homepage is instantaneously displayed on the screen and the necessary information is obtained by employing a procedure for reading a barcode representing a URL affixed on a magazine advertisement or newspaper insert and converting the thus read barcode to the URL and a procedure for having Mosaic and Netscape Navigator access a homepage.

Still further, a medium concerning the present invention, that is a magazine advertisement or newspaper insert, bears a barcode representing an address such as a URL and such a barcode can be easily read by a scanner.

Next, an apparatus and method for accessing a WWW homepage and a medium therefor according to the present invention will be explained by referring to the attached drawings.

Figure 1:
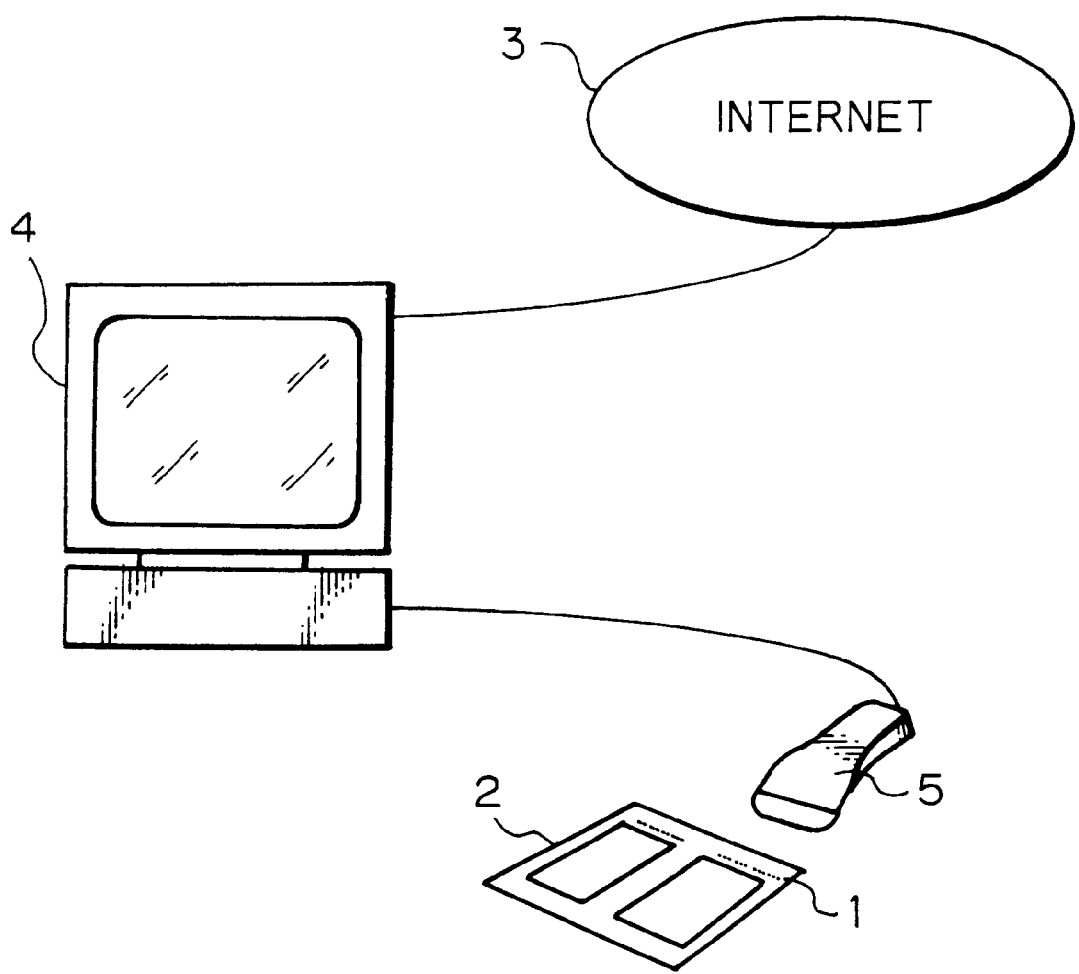
FIG. 1 is an overview of one embodiment of the invention showing a system for accessing a WWW homepage by scanning a digital code such as a two-dimensional barcode.
Figure 2:
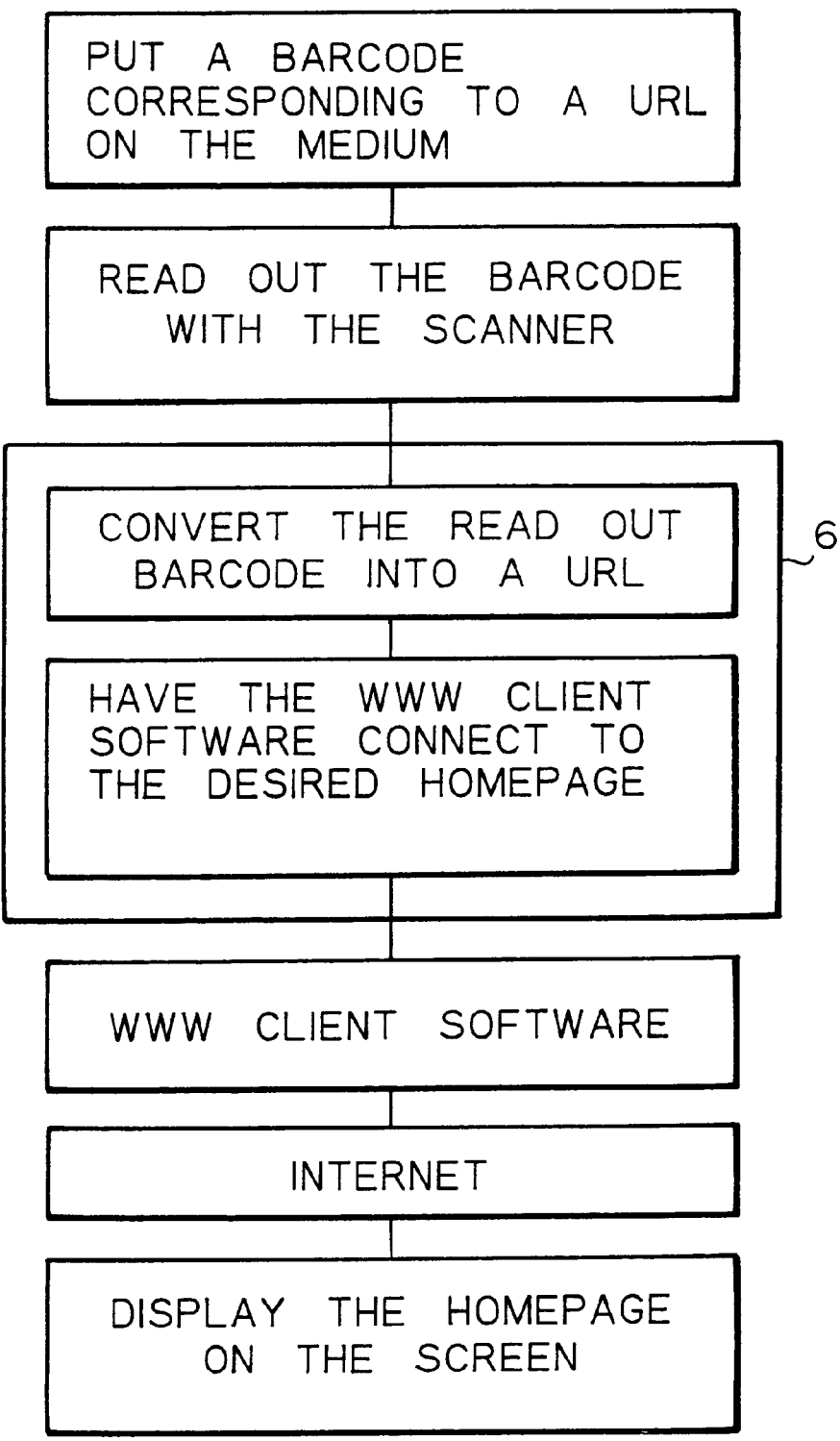
FIG. 2 is a flow-chart showing the operation performed by the system shown in FIG. 1.

FIG. 1 is a schematic diagram showing a communication system which is an embodiment of the present invention. Referring to FIG. 1, the communication system consists of a printed medium 2 on which a barcode 1 representing a URL is affixed and a scanner 5 connected to a personal computer 4 having access to the Internet 3 for reading the barcode. FIG. 2 is a flow chart for explaining the operation of software 6 containing a procedure for converting a barcode read by the scanner to a URL and a procedure for having a browser software, such as Mosaic or Netscape Navigator, access a homepage.

Figure 3:
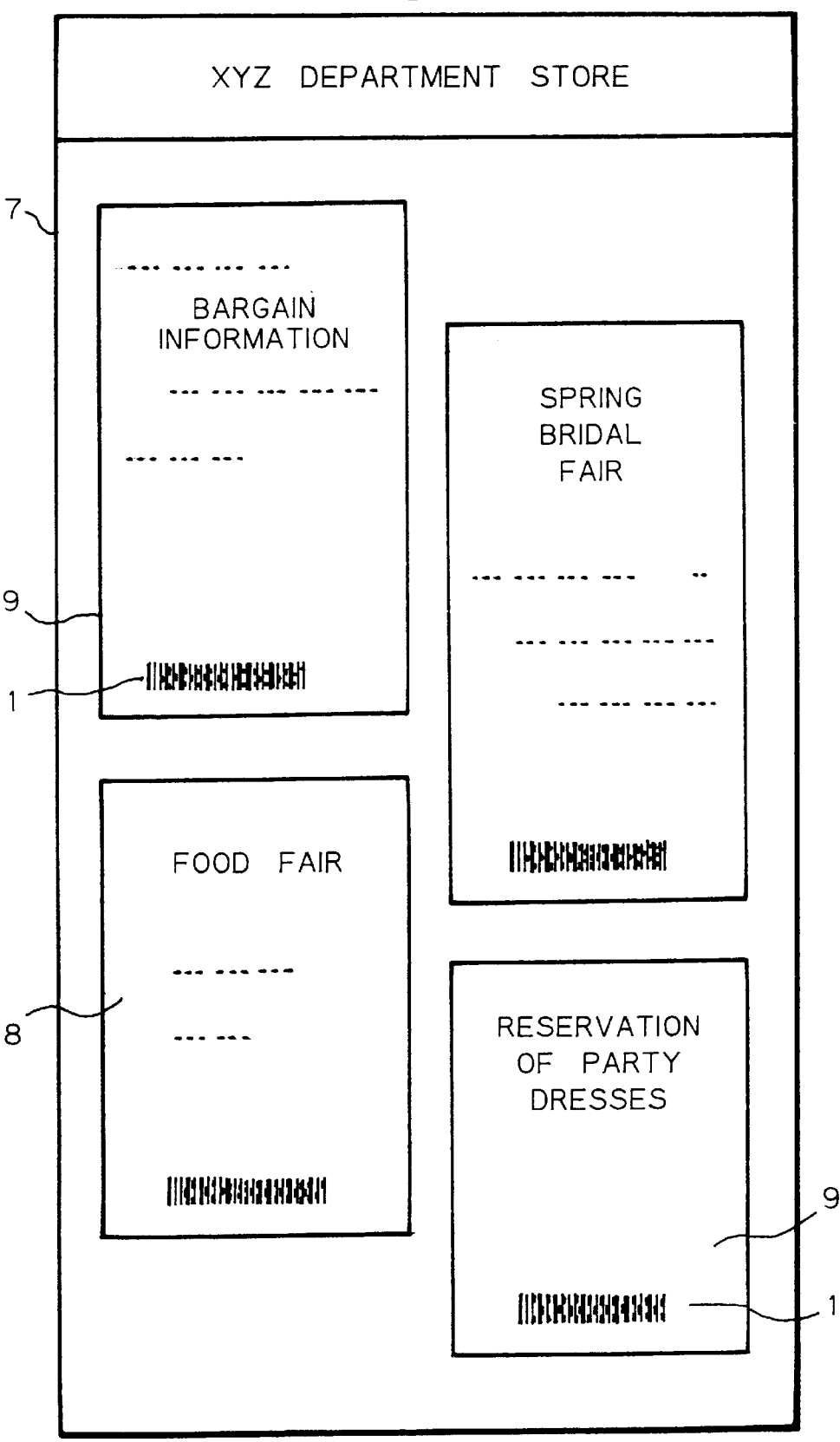
FIG. 3 shows two-dimensional barcodes affixed onto a newspaper insert with an advertisement of a department store.
Figure 4:
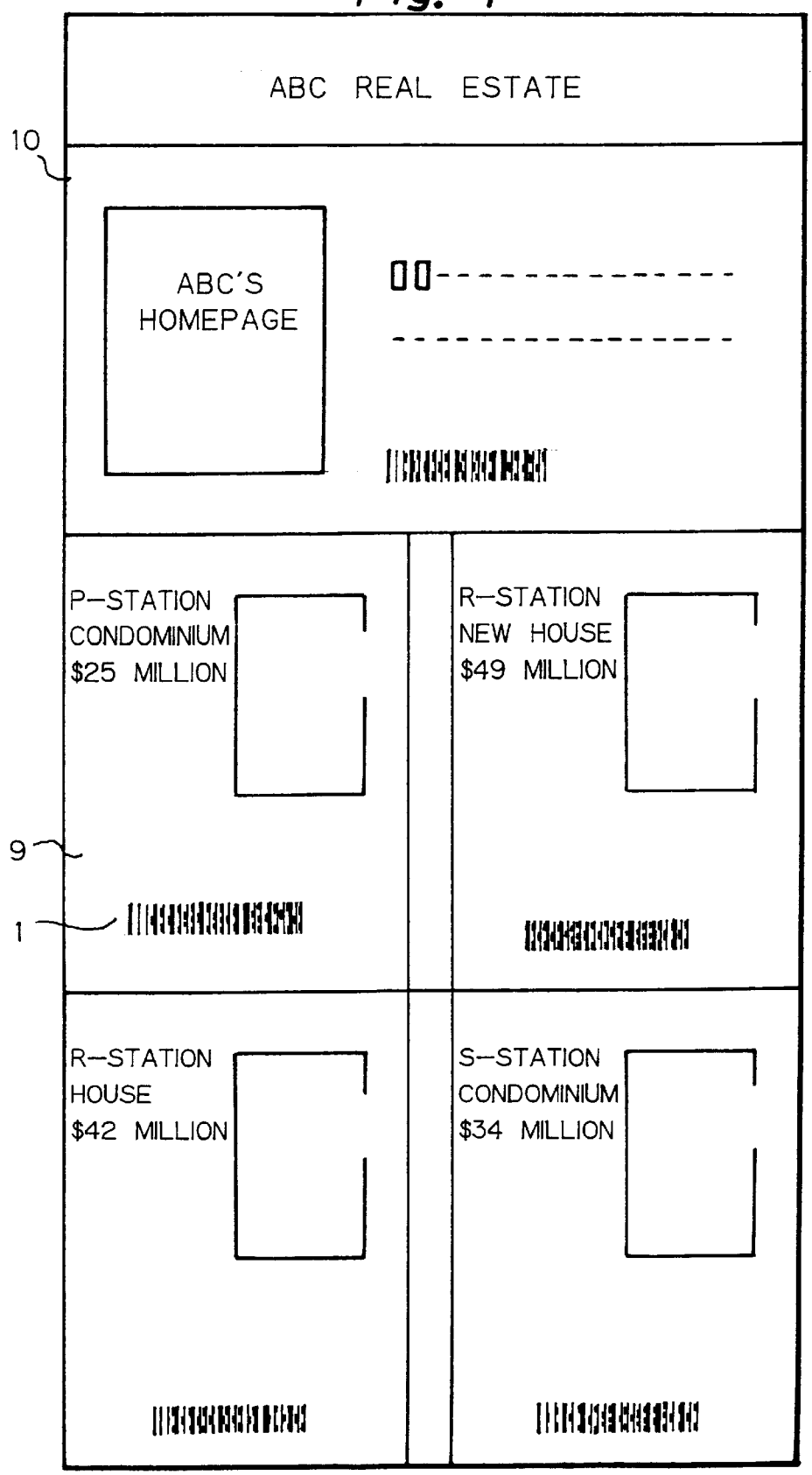
FIG. 4 shows two-dimensional barcodes affixed onto a newspaper insert with an advertisement of a real estate agency.
Figure 5:
FIG. 5 shows two-dimensional barcodes affixed onto a magazine article with newly introduced URL's.

FIGS. 3–5 show actual examples of use of the embodiment. FIG. 3 shows an example where the URL 9 and barcode 1 representing URL 9 are printed side be side on magazine advertisement 7 for homepage introduction article 8. In this example, when a reader of magazine advertisement 7 desires to learn more details of article 8, the reader scans the barcode 1 by the scanner to thereby display the desired homepage on the screen of his/her personal computer. FIG. 4 is an example where the URL 9 and barcode 1 are printed together with pictures, prices, and rough sketches of real property introduced in a newspaper insert. In this example, as in the previous example in FIG. 3, a homepage is easily accessed and displayed on a personal computer screen by a simple scanning operation, whereby information which cannot be thoroughly conveyed in the form of a newspaper insert is provided or supplemented. FIG. 5 shows a newspaper insert, wherein the URL 9 and barcode 1 are printed for each advertisement in a combined advertisement 11 to provide access to a homepage of each advertiser.

Although a personal computer is used as an apparatus to connect to the Internet in the above embodiment, any other apparatus such as a computer game machine may be employed instead, as long as it is able to access the Internet. Furthermore, although any scanner may be employed, when a two-dimensional barcode is adopted, a scanner which is able to read a two-dimensional code should be used. Needless to say, a barcode may be affixed on any sort of medium.

The software 6 is either employed in addition to a WWW client software for accessing Internet, such as Mosaic and Netscape, or incorporated into a computer beforehand.

In another embodiment of the invention, a two-dimensional barcode is employed to record, in a unified manner, the identification information of the destination of the communication. An example of the two-dimensional barcode is the one according to the standard of PDF 417. Two-dimensional barcodes according to other standards may also be employed. Although a conventional one-dimensional barcode, which is well known and widely used, does not possess sufficient storage capacity, a two-dimensional barcode can be an identifier which stores a telephone number, facsimile number, URL, E-mail address, and some information regarding the individual or the possessor of the identification information. In still another embodiment of the invention, another two-dimensional barcode according to any one of the stack methods, which includes the above-mentioned PDF 417 or a two-dimensional code according to the matrix method, is employed.

A two-dimensional barcode according to the stack method is a set of conventional barcodes stacked together in a vertical direction. CODE 49 and PDF 417 are typical examples thereof and are shown in FIG. 6. A two-dimensional code according to the matrix method is constructed of a number of small black and white squares arranged in a pattern so that the angle and size of the pattern are read out to be decoded. DATA CODE and QR code are typical examples thereof and are also shown in FIG. 2. The SCAN TALK code is another example.

Figure 8:
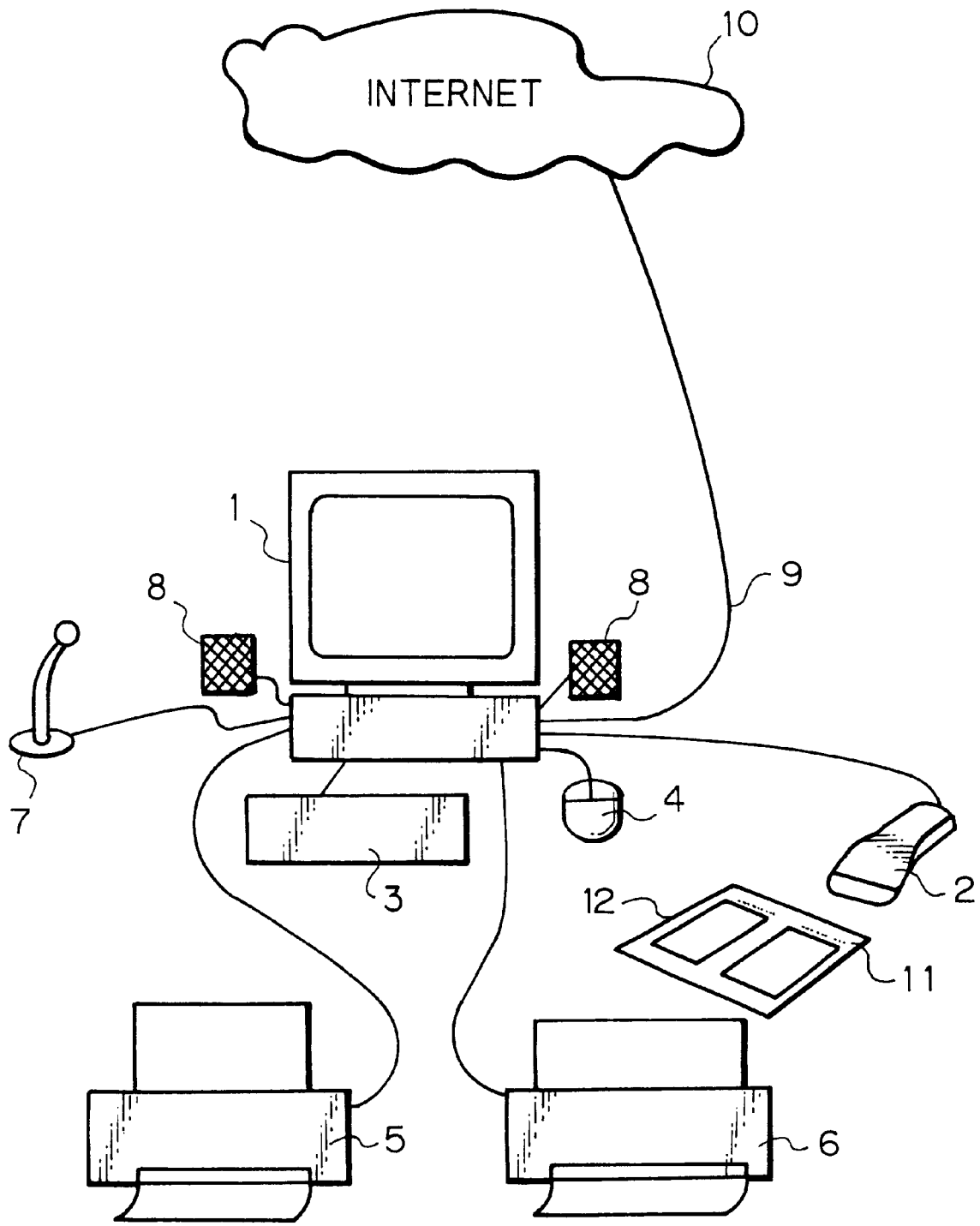
FIG. 8 shows an overview of a communication system according to another embodiment of the present invention.

Referring to FIG. 8, the communication system according to an embodiment of the present invention is illustrated. The communication system comprises a personal computer 1 with a communication capability realized by a modem or a terminal adapter, for example. A two-dimensional barcode reader 2, a keyboard 3, a mouse 4, a printer 5, a scanner 6, a microphone 7, and a speaker 8 are connected to the personal computer 1. Instead of a printer 5, which is an ordinary printer for personal use, a more sophisticated printing system designed for a professional printing company may be used. The personal computer 1 is also connected to the Internet 10 via a telephone line 9. One may scan the two-dimensional barcode 11 with a two-dimensional barcode reader 2 so as to acquire the destination's (receiver's) identification information printed on identification tag 12.

The two-dimensional barcode 11 may be a stealth code printed in a fluorescent ink for design purposes, for example. In such a case, a two-dimensional barcode reader is used which is capable of transmitting and recognizing light of any frequency from infrared to ultraviolet rays. When such a stealth code is used, the location at which the two-dimensional barcode is printed may be arbitrary and the code will still not interfere with the already printed contents of a map, for example.

In FIG. 8, the two-dimensional barcode reader 2 is constructed independently of the personal computer 1. Instead of using such a desktop type computer, however, the two-dimensional barcode reader 2 may be constructed as a part of or further integrated with a portable information terminal with a communication ability such as a portable telephone or a handheld type radio terminal. If such a terminal is not equipped with a display or if the equipped display is not sufficient to view a WWW homepage, the terminal may be used as a settop terminal for a television set so that the homepage may be displayed on the television screen.

Figure 9:
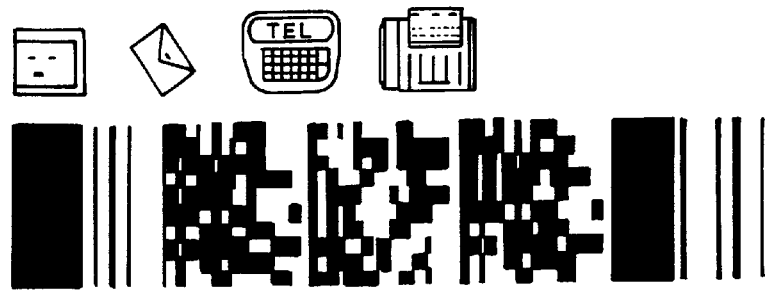
FIG. 9 shows, in the upper portion, enlarged illustrative marks attached in the vicinity of a two-dimensional barcode showing what kind of information is included in the barcode. In the lower portion, the similar marks are shown, where the two-dimensional barcode is printed in stealth ink within the dotted frame. The dotted frame is added only for the illustrative purpose and does not actually exist.
Figure 9:
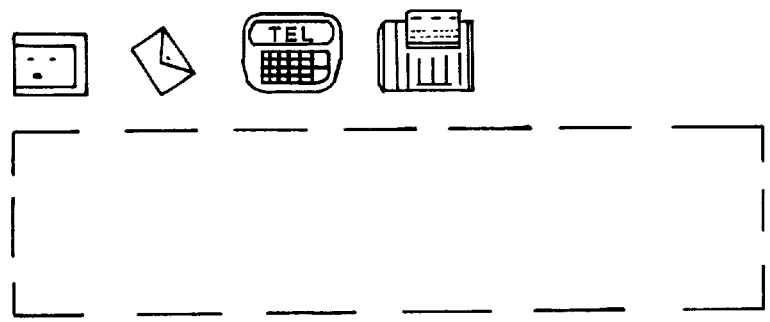

By attaching an illustrative mark in the vicinity of the two-dimensional barcode 11, the particular kind of information represented in the barcode may be hinted. In the present invention, a two-dimensional barcode basically includes four kinds of individual identification information. However, the two-dimensional barcode 11 may include only two kinds of information, i.e., a URL and a telephone number, and such a fact may be indicated by the specific mark attached. In FIG. 9, an enlarged example of a two-dimensional barcode with a mark attached nearby is shown. The two-dimensional barcode shown at an upper column of FIG. 9 with marks attached at its upper left neighborhood indicates what information is included in the code. In this case, all the four kinds of information is included. At the lower column of FIG. 4, a two-dimensional barcode is shown which is made stealth. A dotted frame is added for illustrative purposes but, in reality, such a frame does not exist. Within the frame, a two-dimensional barcode is printed in a stealth ink. Further, by using a specific mark, it can be indicated that the barcode is not one that is used in a distribution industry but one according to the present invention.

Figure 10:
FIG. 10 shows the two-dimensional barcode used in the present invention printed on a personal business card.
Figure 10:

The two-dimensional barcode 11 may normally be printed on a tag 12 which is a label with an adhesive on its back. In other cases, a two-dimensional barcode may be made as an image file and attached, on the computer screen, onto a certain document being prepared thereon and ready to be printed so that the barcode may be printed out together with the document. By doing so, a two-dimensional barcode may be provided on a wide variety of media as long as the medium is printable. Possible examples include advertisements inserted in and delivered with a newspaper, pages in a magazine, PR leaflets from a local government, handout bills at a train station, and so on. The tag 12 is printed as a small adhesive label divided into a number of two-dimensional barcodes so that the person who receives the tag can detach a desired portion and put it on his/her notebook so as to access the destination represented by it later on his/her personal computer. FIG. 10 shows an example where a two-dimensional barcode according to the invention is provided on a personal business card.

In accordance with the communication system of the present invention, while a specific WWW homepage is being accessed, the two-dimensional barcode including the identification information of the accessed website as well as the above-mentioned illustrative mark can be printed out using printer 5. On the other hand, after specifying a destination, the two-dimensional barcode corresponding to the destination may be printed out. In such cases, identification information other than the already specified URL is read out of a database stored in an associated hard disk in the personal computer 1 and included in the two-dimensional barcode to be printed out. The sending party, address, and additional information may be manually inputted and added. Because the printer 5 of the communication system, according to the present invention, is capable of printing two-dimensional barcodes, those individuals and corporations wishing to be accessed will be able to supply the two-dimensional barcodes with their own identification information included and promote others to access them. Advertisers of any kind may be examples of individuals and corporations who wish to be accessed by others.

Figure 11:
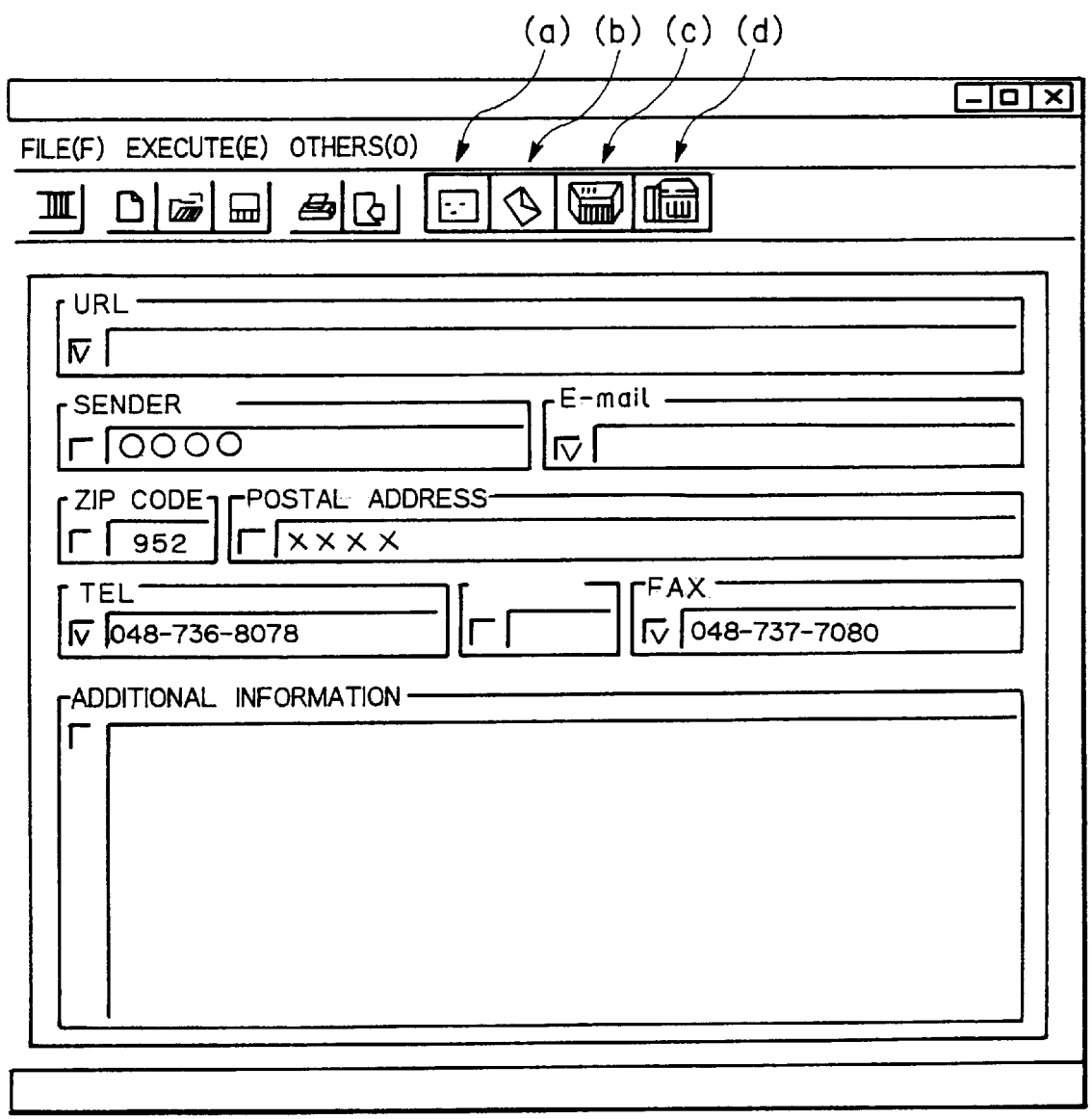
FIG. 11 shows an exemplary user interface display of the communication system of FIG. 8.

An example of a displayed graphical user interface is shown in FIG. 11. On an upper portion of the display, a tool bar including icons is shown, where the four icons from the right end are the icons through which the designated functions are executed by clicking them. Icon (a) is used for an access to a WWW homepage, (b) for an E-mail transmission, (c) for a direct telephone call from this screen, and (d) for a facsimile transmission.

Below the icons, a column is shown which shows an address such as a URL. By scanning a two-dimensional barcode 11 using a two-dimensional barcode reader 2, the encoded destination identification information is recognized by scanning and displayed in this column. As mentioned above, the amount of information included does not have to be fixed but can be selected as desired. For example, when the E-mail address and telephone number are obtained, one is able to transmit an E-mail to the destined address by clicking icon (b) and make a telephone call to the specified person by clicking icon (c).

One can directly input a URL via the keyboard 3 and have the two-dimensional barcode corresponding to it printed out by printer 5. On the other hand, by scanning the already existing two-dimensional barcode 11, a specific URL may be input and taken into the display. Then, the thus taken information may be printed out as a two-dimensional barcode in a manner desired by the user. A small blank or checked square on the left side next to each of the identification information such as a URL is designed for the purpose of designating whether the information on the right side of the square should be included in the prospective barcode to be printed out. That is, even if a URL is displayed in the column, the information corresponding to the URL will not be included in the printed out two-dimensional barcode unless the square is checked. Because of the function of these small squares, one can select desired information and have it printed out as a two-dimensional barcode.

When one wishes to make a telephone call, he/she can talk into the microphone 7 and listen to the other party from the speaker 8. An ordinary telephone apparatus (not shown in the drawings) may instead be used.

When one wishes to send an E-mail, after selecting the kind of transmission by clicking a relevant icon, he/she actually types the letter using ordinary word processing or editor software. Instead, he/she may speak into the microphone 7 and have the inputted voice converted into a text by software designed for audio recognition. When one is going to send a facsimile, one may have a draft inputted into the computer 1 as an image by the scanner 6 or write it on the computer 1 and have it directly sent from the computer after an appropriate setup. An ordinary facsimile machine may be employed instead of making the draft directly on the computer 1.

The above-explained graphical user interface may also be used on such an integrated portable terminal into which the two-dimensional barcode reader is incorporated other than a desktop type personal computer. In such cases, one uses a pen type input device instead of a mouse. Those skilled in the art will be able to recognize that buttons which are physically pushed down may be used instead of the icons for initiating each function.

Figure 12:
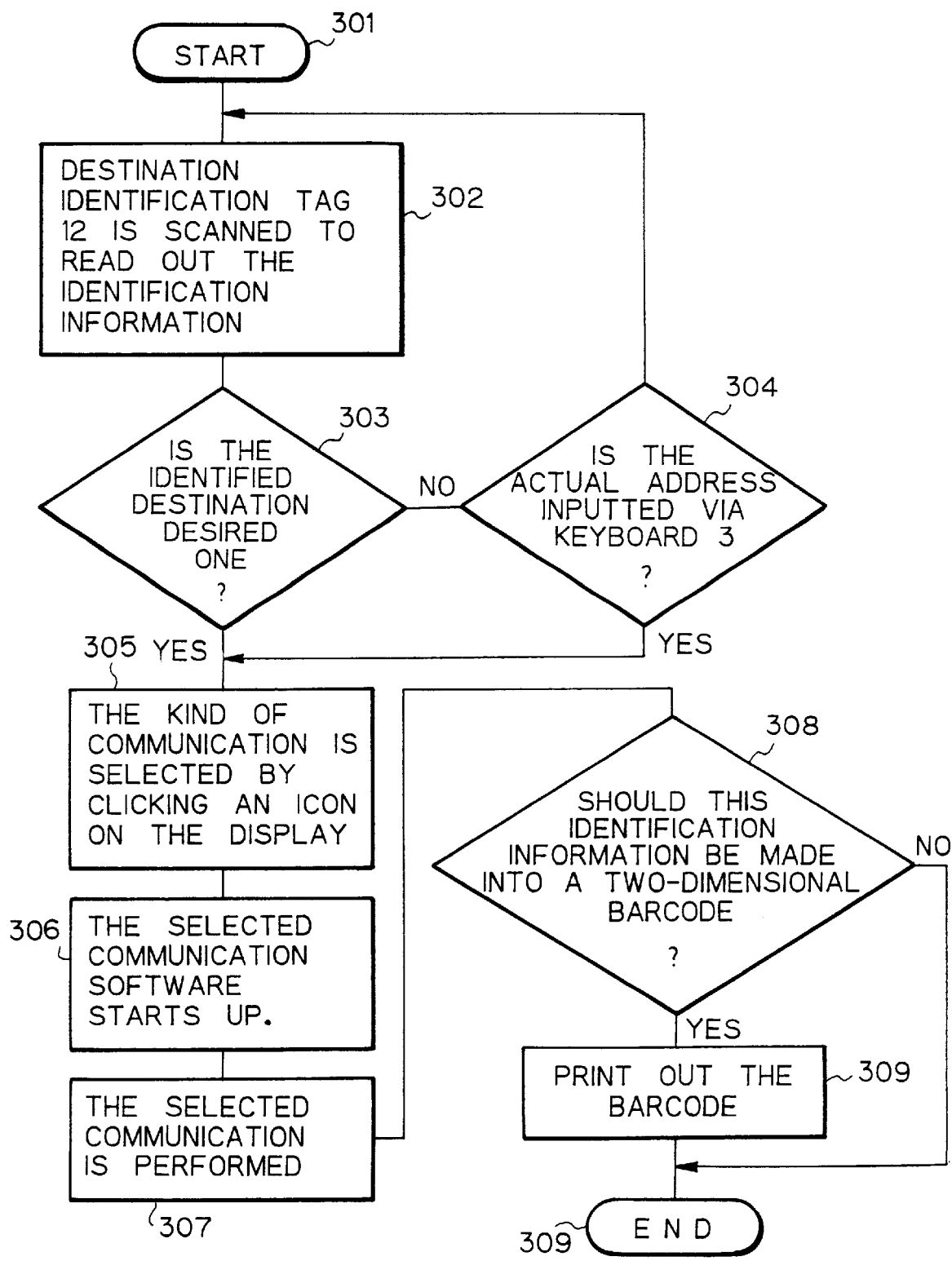
FIG. 12 shows a flow-chart illustrating the operation of the system of the communication of FIG. 8.

Referring to FIG. 12, a process shall be explained below which the communication system of the invention performs. The process begins at step 301 and proceeds to step 302, where the identification tag 12 is scanned using the two-dimensional barcode reader 2 so as to read out the identification information recorded in the two-dimensional barcode. The thus read out destination information will be displayed on the screen of the personal computer 1. By viewing the displayed information, the user determines at step 303 whether this is the desired destination. If the determination at step 303 is in the affirmative, the process proceeds to step 305. In the case of a negative determination at step 303, the identification code is again scanned or an actual identification information is inputted via keyboard 3 at step 304. At step 305, the user selects a kind of communication by clicking an associated icon on the screen with the mouse 4. Accordingly, the thus selected software starts up at step 306 and the communication is performed at step 307. If one wishes to have the identification information of the destination currently being accessed represented in a code on a sheet of paper, he/she may have it printed out as a two-dimensional barcode, for example (steps 308 and 309).

As is done at step 304, one may manually input into the computer an actual URL of a specific homepage via the keyboard 3. Similar operations can be done in the case of sending an E-mail to a specific individual having an address. The URL's and E-mail addresses are a combination of alphanumeric letters and symbols. The correct specification of them, though not very easily done, is required in order to reach a desired destination. However, they are, especially in the case of URL'S, in some cases quite long. The column designed for the display of a URL is not very spacious because the URL's are so long, which makes it more difficult for a user to recognize these small characters. Once the communication system according to the invention, however, is used, any URL can be instantaneously input by scanning the associated two-dimensional barcode.

Many magazines and newspapers today carry URL's for homepages to provide their readers with product or sales information, for example. Magazines and books dedicated to Internet matters naturally carry various URL'S. To search a homepage of a special interest of an individual, one can refer to thick and heavy volumes having classified lists of homepages as well as using search engines. In the world of the Internet, since whether one is within a certain country does not matter at all when he/she wishes to make an access to any website on the WWW, such Internet yellow pages will be useful regardless of the country where the prospective user is.

However, if an individual wishes to access an as-yet-accessed site which is neither bookmarked in the browser nor linked from some known site, he/she is obliged to manually input its URL via a keyboard while referring to a page in a magazine. This is not an easy task for those who are not accustomed to the keyboard operation. The communication system of the present invention is such that a user need not be bothered by such a laborious task.

The usage of the present invention is not limited to the above described embodiments. The mail order industry will benefit from the invention if they add to their catalogues the tags on each of which a two-dimensional barcode is printed so that a prospective reader is able to access the mail order seller in various ways including telephone and facsimile transmission or WWW homepage access. Instead of using an ordinary telephone, an Internet telephone may be used.

While preferred embodiments of the invention have been shown and described, improvements, changes, and modifications of the invention will be perceived by those skilled in the art. For example, the identification information of a targeted receiver of the communication such as a two-dimensional barcode may be provided on a variety of media other than on an ordinary paper. Such media include CD-ROM, optical disks, etc. Therefore, such improvements, changes, apparatus modifications are intended to be included within the scope of the invention as defined by the following claims.

What is claimed is:

1. A communication system for performing a single kind of communication and a selective communication, said system comprising:

destination specifying means, used in both the single kind of communication and the selective communication, for specifying a destination, said destination specifying means carrying a notification code corresponding to the destination;

means, used in the selective communication, for selecting a kind of communication;

means, used in the single kind of communication, for reading out the notification code;

means, used in the selective communication, for reading out the notification code on said destination specifying means;

means, used in the single kind of communication, for performing a communication corresponding to single information included in the notification code in response to the reading out of the notification code;

means, used in the selective communication, for converting the read out notification code to a destination identification code corresponding to the notification code in the selected kind of communication; and means, used in the selective communication, for performing the selected kind of communication to the destination specified by the destination identification code;

wherein the notification code is printed in an ink which is invisible with naked eyes but which can be scanned by each of said reading out means.

2. A communication system for performing a single kind of communication and a selective communication, said system comprising:

destination specifying means, used in both the single kind of communication and the selective communication, for specifying a destination, said destination specifying means carrying a notification code corresponding to the destination;

means, used in the selective communication, for selecting a kind of communication;

means, used in the single kind of communication, for reading out the notification code;

means, used in the selective communication, for reading out the notification code on said destination specifying means;

means, used in the single kind of communication, for performing a communication corresponding to single information included in the notification code in response to the reading out of the notification code;

means, used in the selective communication, for converting the read out notification code to a destination identification code corresponding to the notification code in the selected kind of communication; and means, used in the selective communication, for performing the selected kind of communication to the destination specified by the destination identification code;

wherein the notification code is printed in an ink which is invisible with naked eyes but which can be scanned by each of said reading out means, and wherein at least one mark, which visually represents a kind of information contained in the notification code, is attached in a vicinity of the notification code.

3. A communication method for performing a single kind of communication and a selective communication, said method comprising:

providing, in both the single kind of communication and the selective communication, a destination specifying means carrying a notification code corresponding to the destination;

selecting, in the selective communication, a kind of communication;

reading out, in the single kind of communication, the notification code;

reading out, in the selective communication, the notification code on the destination specifying means;

performing, in the single kind of communication, a communication corresponding to single information included in the notification code in response to the reading out of the notification code;

converting, in the selective communication, the read out notification code to a destination identification code corresponding to the notification code in the selected kind of communication; and performing, in the selective communication, the selected kind of communication to the destination specified by the destination identification code;

wherein the notification code is printed in an ink which is invisible with naked eyes but which can be scanned during each of said reading out steps.

4. A communication method for performing a single kind of communication and a selective communication, said method comprising:

providing, in both the single kind of communication and the selective communication, a destination specifying means carrying a notification code corresponding to the destination;

selecting, in the selective communication, a kind of communication;

reading out, in the single kind of communication, the notification code;

reading out, in the selective communication, the notification code on the destination specifying means;

performing, in the single kind of communication, a communication corresponding to single information included in the notification code in response to the reading out of the notification code;

converting, in the selective communication, the read out notification code to a destination identification code corresponding to the notification code in the selected kind of communication; and performing, in the selective communication, the selected kind of communication to the destination specified by the destination identification code;

wherein the notification code is printed in an ink which is invisible with naked eyes but which can be scanned during each of said reading out steps, and wherein at least one mark, which visually represents a kind of information contained in the notification code, is attached in a vicinity of the notification code.

5. A communication method for specifying a destination by using a digital code, said method comprising:

providing destination specifying means carrying a digital code corresponding to the destination;

selecting a kind of communication;

reading out the digital code carried on the destination specifying means;

converting, in response to said reading out the digital code, digital information included in the read out digital code to a destination identification code corresponding to the digital code; and performing the selected communication to the destination specified by the destination identification code;

wherein the digital code is printed in an ink which is invisible with naked eyes but which can be scanned during said reading out step.

6. A communication method for specifying a destination by using a digital code, said method comprising:

providing destination specifying means carrying a digital code corresponding to the destination;

selecting a kind of communication;

reading out the digital code carried on the destination specifying means;

converting, in response to said reading out the digital code, digital information included in the read out digital code to a destination identification code corresponding to the digital code; and performing the selected communication to the destination specified by the destination identification code;

wherein the digital code is printed in an ink which is invisible with naked eyes but which can be scanned during said reading out step, and wherein at least one mark, which visually represents a kind of information contained in the digital code, is attached in a vicinity of the digital code.

7. A communication system for performing a single kind of communication and a selective communication, said system comprising:

destination specifying means, used in both the single kind of communication and the selective communication, for specifying a destination, said destination specifying means carrying a notification code corresponding to the destination;

means, used in the selective communication, for selecting a kind of communication;

means, used in the single kind of communication, for reading out the notification code;

means, used in the selective communication, for reading out the notification code on said destination specifying means;

means, used in the single kind of communication, for performing a communication corresponding to single information included in the notification code in response to the reading out of the notification code;

means, used in the selective communication, for converting the read out notification code to a destination identification code corresponding to the notification code in the selected kind of communication; and means, used in the selective communication, for performing the selected kind of communication to the destination specified by the destination identification code;

wherein the notification code is a bar-code, two-dimensional code, or two-dimensional barcode, and wherein at least one mark, which visually represents a kind of information contained in the notification code, is attached in a vicinity of the notification code so as to visually indicate, prior to the reading of the notification code, that the notification code is provided for communication purposes rather than for distribution, logistics, or identification purposes.

8. A communication method for performing a single kind of communication and a selective communication, said method comprising:

providing, in both the single kind of communication and the selective communication, a destination specifying means carrying a notification code corresponding to the destination;

selecting, in the selective communication, a kind of communication;

reading out, in the single kind of communication, the notification code;

reading out, in the selective communication, the notification code on the destination specifying means;

performing, in the single kind of communication, a communication corresponding to single information included in the notification code in response to the reading out of the notification code;

converting, in the selective communication, the read out notification code to a destination identification code corresponding to the notification code in the selected kind of communication; and performing, in the selective communication, the selected kind of communication to the destination specified by the destination identification code;

wherein the notification code is a bar-code, two-dimensional code, or two-dimensional barcode, and wherein at least one mark, which visually represents a kind of information contained in the notification code, is attached in a vicinity of the notification code so as to visually indicate, prior to the reading of the notification code, that the notification code is provided for communication purposes rather than for distribution, logistics, or identification purposes.

* * * * *